April 8, 1930.  E. D. JANES  1,754,200

SELF LOCKING SLIDE FASTENER

Filed April 2, 1929

Inventor
Edmund D. Janes
by
Attorney

Patented Apr. 8, 1930

1,754,200

UNITED STATES PATENT OFFICE

EDMUND D. JANES, OF WATERBURY, CONNECTICUT, ASSIGNOR TO SCOVILL MANUFACTURING COMPANY, OF WATERBURY, CONNECTICUT, A CORPORATION OF CONNECTICUT

SELF-LOCKING SLIDE FASTENER

Application filed April 2, 1929. Serial No. 351,945.

The object of this invention is to provide an adjustable slide carrying one member of a fastener for cooperation with a head or stud to effect the closing and fastening of an article to which these parts are applied, such as overshoes, gaiters, slippers and gloves, as well as other articles.

It is desirable that such fasteners should be self-locking, and capable of easy adjustment, so as to effect the closing and connection of the parts without strain and undue pressure upon any portion of the wearer or user.

Prior to this invention fasteners of this generic type have used a head or stud that cooperates with a part in which a keyhole shaped slot has been used, but this requires care on the part of the assembler to set the slotted part so that the narrow part of the slot shall stand in the direction of strain when in use.

In the present invention the slot has a median or central head or stud receiving part and from this part the slot extends in opposite directions, so that it is operative to engage the head or stud whether the slide containing the slotted portion is set either end leading; and the proportions of the slotted part and the head or stud are such as to insure a close and relatively flat fit of the parts when engaged and one which is not readily separated by accident in use, as I will proceed now more particularly to explain and finally claim.

Figure 1:
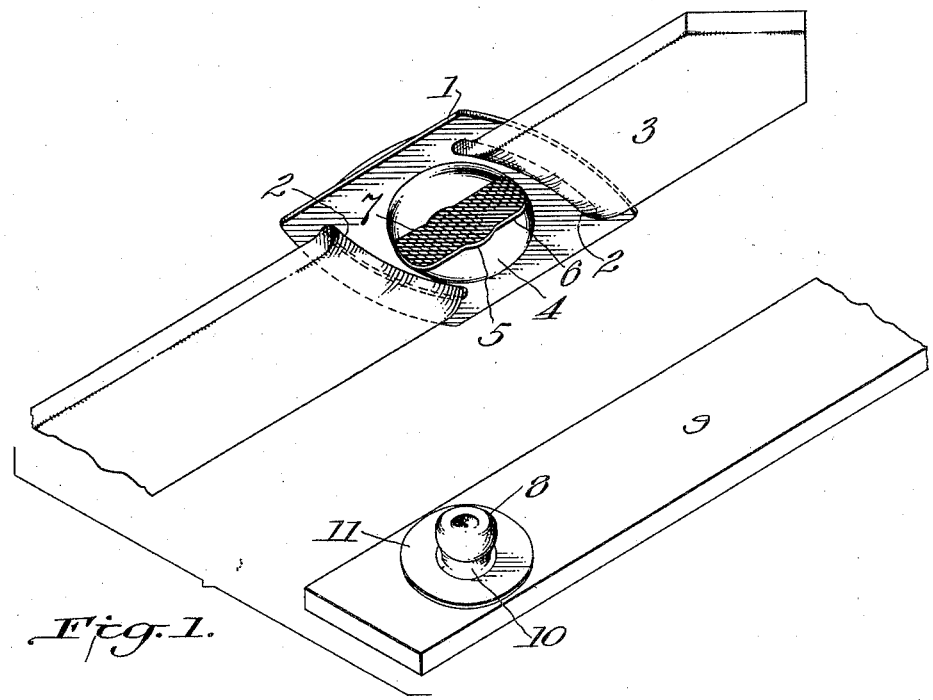
Figure 2:
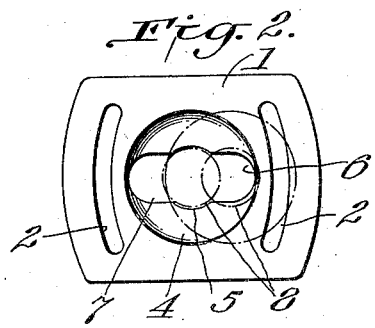
Figure 3:
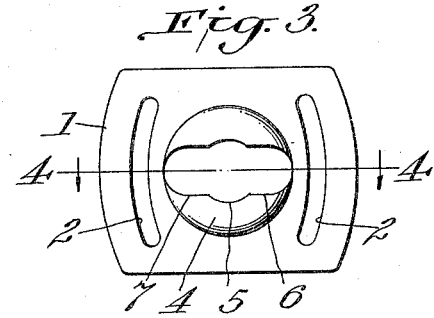
Figure 4:

In the accompanying drawings illustrating the invention, in the several figures of which like parts are similarly designated, Figure 1 is a perspective view showing the slide and the head or stud mounted, conventionally. Fig. 2 is a top plan view of the slide, with the head or stud shown in dotted lines in engaged position with the slide. Fig. 3 is a bottom plan view of the slide detached. Fig. 4 is a cross-section on line 4—4 of Fig. 3.

The slide comprises a flat plate 1, of thin metal, having near opposite ends the transverse slots, 2, to receive the strap 3, and the intermediate depressed portion 4, having the median or central circular opening or hole 5 from which extend the two parallel side openings 6 and 7 of less width than the diameter of the circular hole to engage with the head or stud 8, mounted on the part 9.

The depression 3 may be circular as shown, or of angular or other shape to conform to the contour of the plate.

The head or stud 8 may be one of any number of styles of snap-fastener heads or studs and mounted on the fixed or other part 9 of an article to which it is applied.

The slots 2 may be arcuate, as shown, in order the more securely to engage the strap 3 and be held frictionally in adjusted position thereon.

As indicated by the dotted lines, Fig. 2, the slide and the head or stud are engaged by passing the larger diameter of the head or stud through the circular opening 5 so that its constricted neck or knurl 10 may thereafter be drawn into one or the other of the openings 6 and 7 by release of assembling pressure, and then the larger diameter portion of the head or stud will overlie the edges of the openings 6 or 7 and so effect a secure self-locking engagement with the slide and a fastening of the two parts on which the slide and head or stud are mounted.

The provision of two openings 6 and 7 extending toward the opposite ends of the plate 1, in opposite directions from the central opening 5 through which the head or stud enters into engagement with the slide, admits of the setting of the slide on part 3 with either end leading, in order to receive and engage the head or stud, and thus frees the assembler from the necessity of exercising care in such assembling.

By the construction described, there is no necessity for pressing the parts together, as is required in uniting ordinary spring snap fasteners, much to the discomfort of the users, especially where the fastening is applied to the ankle or wirst of the users. As the fit of the article supplied with the present invention, must be snug and the parts of the article must be pulled tightly about the wearer, there would be no danger of the slide unhooking or being released from the head or stud, since there is always more or less tension that would pull the head or stud toward the end of the openings 6 or 7 and keep it there until purposely released.

The neck or knurl of the head or stud is as close to the flange, 11, of the head or stud as possible. If a slide flat throughout were used, the thickness of the strap on the underside of the slide at each end, would tend to lift the engaging portion of the slide above this neck or knurl, so that it would be inconvenient to slide the head or stud into the openings. The provision of the depressed center extending below the plane of the plate 1 a distance substantially equal to the thickness of the strap, permits the slide to lie close to the article on which used without any tendency of the strap to force it off of the head or stud. Thus a very simple, easily operated and efficient slide is produced.

Variations in the details of construction are permissible within the principle of the invention and the claims following.

What I claim is:—

1. A self-locking slide fastener, comprising a plate slotted for adjustment on a supporting article either end leading, and having a depressed center provided with a median opening to permit the passage therethrough of a cooperating head or stud, said head or stud having a constricted neck, and said plate having other openings leading out of the median opening in opposite directions and of less width than the median opening to be engaged by the neck and the overlying head or stud.

2. A self-locking slide fastener, comprising a plate slotted for adjustment on a supporting article either end leading, and having a center provided with a median opening to receive a cooperating head or stud and other openings leading out of the median opening toward opposite ends of the plate and of less width than the median opening, said center being depressed to an extent substantially equal to the thickness of the supporting article.

3. A self-locking slide fastener, comprising a plate slotted for adjustment either end leading on a supporting article and having a center portion depressed below the level of the plate and provided with a three part opening one of which parts is of larger width than the others, said smaller width other parts leading away from the larger diameter part toward opposite ends of the plate, combined with a head or stud having a part that may be passed into and out of the larger diameter portion of the slide opening and also having a neck or knurl that will engage either one of the out-leading parts of the three-part opening, to effect a self-locking of the slide and head or stud regardless of which out-leading opening is in advance.

In testimony whereof I have hereunto set my hand this 1st day of April, A. D. 1929.

EDMUND D. JANES.